(12) United States Patent
Lee et al.

(10) Patent No.: US 9,577,692 B2
(45) Date of Patent: Feb. 21, 2017

(54) SUBSCRIBER IDENTIFICATION MODULE MANAGEMENT METHOD AND ELECTRONIC DEVICE SUPPORTING THE SAME

(71) Applicant: Samsung Electronics Co., Ltd., Gyeonggi-do (KR)

(72) Inventors: Sang Soo Lee, Gyeonggi-do (KR); Duc Key Lee, Seoul (KR); Tae Sun Yeoum, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/804,001

(22) Filed: Jul. 20, 2015

(65) Prior Publication Data
US 2016/0020804 A1 Jan. 21, 2016

(30) Foreign Application Priority Data

Jul. 19, 2014 (KR) .......................... 10-2014-0091389

(51) Int. Cl.
*H04W 4/00* (2009.01)
*H04B 1/3816* (2015.01)
(Continued)

(52) U.S. Cl.
CPC .............. *H04B 1/3816* (2013.01); *H04W 8/18* (2013.01); *H04W 8/205* (2013.01)

(58) Field of Classification Search
CPC .......... H04W 4/00; H04W 8/04; H04W 60/00; H04W 36/14; H04W 48/16; H04W 48/18; H04W 88/06; H04M 1/00
(Continued)

(56) References Cited

U.S. PATENT DOCUMENTS 8,634,828 B2 * 1/2014 Shi .................. H04W 4/003
455/432.3
8,843,179 B2 9/2014 Li et al.
(Continued)

FOREIGN PATENT DOCUMENTS

KR 1020130026351 3/2013
KR 1020140051018 4/2014
(Continued)

OTHER PUBLICATIONS

International Search Report dated Nov. 25, 2015 issued in counterpart application No. PCT/KR2015/007432, 3 pages.
(Continued)

*Primary Examiner* — Huy C Ho
(74) *Attorney, Agent, or Firm* — The Farrell Law Firm, P.C.

(57) ABSTRACT

An electronic device and method of managing a Subscriber Identification Module (SIM) are provided. The electronic device includes a memory configured to store at least one instruction; and a provisioning manager connected to the memory, wherein the instruction related to an operation performance of the provisioning manager is configured to search for an accessible communication service provider network on the basis of a Subscriber Identification Module (SIM) where a profile relating to a communication service connection of at least one communication service provider network is not installed and collect at least one communication service provider information on the basis of the found communication service provider network.

19 Claims, 7 Drawing Sheets

(51) Int. Cl.
*H04W 8/20* (2009.01)
*H04W 8/18* (2009.01)

(58) Field of Classification Search
USPC ...................................................... 455/435.1
See application file for complete search history.

(56) References Cited

U.S. PATENT DOCUMENTS

| | | | |
|---|---|---|---|
| 8,996,002 B2 | 3/2015 | Rodgers et al. | |
| 2011/0306318 A1* | 12/2011 | Rodgers ............... | H04W 8/183 |
| | | | 455/410 |
| 2013/0281085 A1 | 10/2013 | Sen et al. | |
| 2013/0303122 A1 | 11/2013 | Li et al. | |
| 2014/0045460 A1 | 2/2014 | Park et al. | |
| 2014/0099916 A1 | 4/2014 | Mallikarjunan et al. | |
| 2014/0134981 A1 | 5/2014 | Park et al. | |
| 2014/0219447 A1 | 8/2014 | Park et al. | |
| 2014/0349617 A1 | 11/2014 | Li et al. | |
| 2015/0281964 A1 | 10/2015 | Seo et al. | |
| 2015/0312699 A1 | 10/2015 | Rodgers et al. | |

FOREIGN PATENT DOCUMENTS

| | | |
|---|---|---|
| KR | 1020140064601 | 5/2014 |
| WO | WO 2013/176499 | 11/2013 |

OTHER PUBLICATIONS

European Search Report dated Dec. 4, 2015 issued in counterpart application No. 15177382.7-1854, 10 pages.

\* cited by examiner

SUBSCRIBER IDENTIFICATION MODULE MANAGEMENT METHOD AND ELECTRONIC DEVICE SUPPORTING THE SAME

PRIORITY

This application claims priority under 35 U.S.C. §119(a) to a Korean Patent Application filed on Jul. 19, 2014 in the Korean Intellectual Property Office and assigned serial number 10-2014-0091389, the entire disclosure of which is incorporated herein by reference.

BACKGROUND

1. Field of the Disclosure

The present disclosure relates generally to a Subscriber Identification Module (SIM) management of an electronic device, and more particularly, to a SIM management method and an electronic device supporting the same, which allow a user to determine a communication service related communication service provider according to the user's preference.

2. Description of the Related Art

In general, existing electronic devices support communication functions. An electronic device uses a SIM in order to support a communication function. The SIM may be mounted in a predetermined area of an electronic device and managed after being authenticated by a communication service provider.

An additional SIM may be manufactured and supplied to an electronic device manufacturer. The electronic device manufacturer may mount the supplied SIM in an electronic device and then, sell it to a communication service provider. If a user wants to purchase an electronic device, a communication service provider may sell it to the user after loading into the electronic device a profile relating to a communication service management function of the electronic device.

In terms of the above-mentioned electronic device's distribution structure, if a user acquires an electronic device separately or acquires an electronic device regardless of a communication service provider (for example, purchases an electronic device on the open market), it is impossible to load a profile relating to a specific communication service provider to provide a communication service to the acquired electronic device.

SUMMARY

The present invention has been made to address the above-mentioned problems and disadvantages, and to provide at least the advantages described below.

Accordingly, an aspect of the present disclosure is to provide a SIM management method and an electronic device supporting the same, which allow a user to determine a communication service related communication service provider according to the user's preference.

Another aspect of the present disclosure is to provide a SIM management method and an electronic device supporting the same, which allow a change of a communication service provider according to a user's preference.

In accordance with an aspect of the present disclosure, an electronic device is provided. The electronic device includes a memory configured to store at least one instruction; and a processor connected to the memory and configured to execute the at least one instruction to search for an accessible communication service provider based on the Subscriber Identification Module (SIM), wherein a profile relating to the accessible communication service provider is not installed and collect information on the accessible communication service provider.

In accordance with an aspect of the present disclosure, a method of managing a SIM is provided. The method includes searching for an accessible communication service provider based on the SIM, wherein a profile relating to a communication service connection provided from the accessible communication service provider is not installed; collecting information from the accessible communication service provider; and outputting the collected information.

In accordance with an aspect of the present disclosure, a device for managing a SIM is provided. The device is configured to search for an accessible communication service provider based on the SIM, wherein a profile relating to a communication service connection provided from the accessible communication service provider is not installed; collect information from the accessible communication service provider, and output the collected information.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
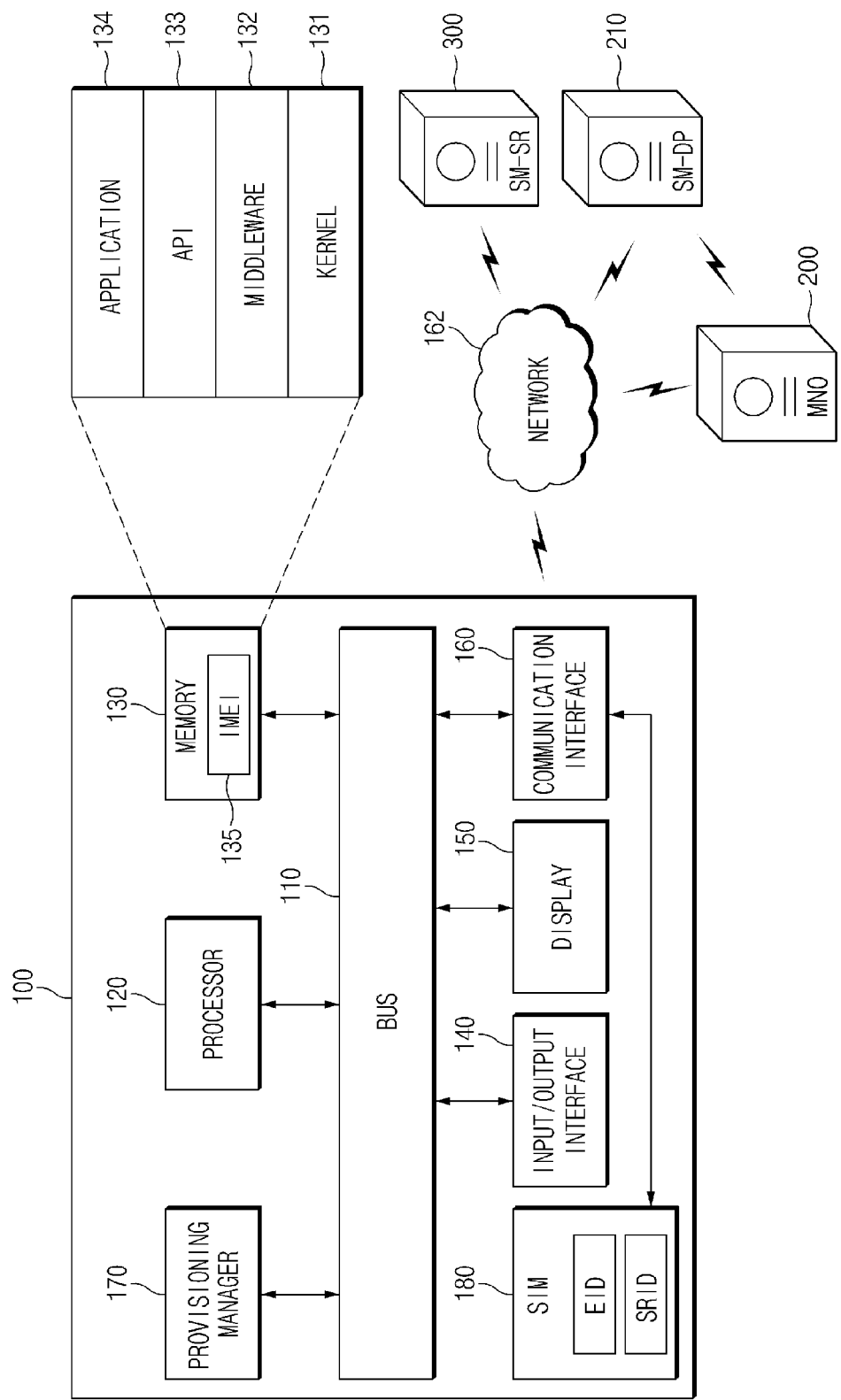
FIG. 1 is a block diagram of an electronic device management environment relating to a Subscriber Identification Module (SIM) according to an embodiment of the present disclosure.

Hereinafter, various embodiments of the present disclosure are disclosed with reference to the accompanying drawings. However, this does not limit various embodiments of the present disclosure to a specific embodiment and it should be understood that the present disclosure covers all modifications, equivalents, and/or alternatives of this disclosure provided they come within the scope of the present disclosure, as defined by the appended claims and their equivalents. With respect to the descriptions of the drawings, like reference numerals refer to like elements.

The terms "include," "comprise," "have", "may include," "may comprise," and "may have" used herein indicate disclosed functions, operations, or existence of elements but do not exclude other functions, operations or elements.

For instance, the expressions "A or B," or "at least one of A and/or B" may include A, B, or both A and B. For instance, the expressions "A or B," or "at least one of A and/or B" may indicate (1) at least one A, (2) at least one B, or (3) both at least one A and at least one B.

Terms such as "$1^{st}$," "$2^{nd}$," "first," "second," and the like used herein may refer to modifying various different elements of an embodiment of the present disclosure, but do not limit the elements. The expressions may be used to distinguish one element from another element. For instance, "a first user device" and "a second user device" indicate different user devices regardless of the order or the importance. For example, a first component may be referred to as a second component and vice versa without departing from the scope of the present disclosure.

In an embodiment of the present disclosure, it will be understood that when a component (for example, a first component) is referred to as being "(operatively or communicatively) coupled with/to" or "connected to" another component (for example, a second component), the component can be directly connected to the other component or connected through another component (for example, a third component). In an embodiment of the present disclosure, it will be understood that when a component (for example, a first component) is referred to as being "directly connected to" or "directly accessed by" another component (for example, a second component), another component (for example, a third component) does not exist between the component (for example, the first component) and the other component (for example, the second component).

The expression "configured to" used in an embodiment of the present disclosure may be interchangeably used with "suitable for," "having the capacity to," "designed to," "adapted to," "made to," or "capable of" according to a situation, for example. The term "configured to" may not necessarily mean "specifically designed to" in terms of hardware. Instead, the expression "a device configured to" in some situations may mean that the device and another device or part are "capable of." For example, "a processor configured (or set) to perform A, B, and C" in a phrase may mean a dedicated processor (for example, an embedded processor) for performing a corresponding operation or a general-purpose processor (for example, a Central Processing Unit (CPU) or application processor) for performing corresponding operations by executing at least one software program stored in a memory device.

Terms used in an embodiment of the present disclosure are used to describe a certain embodiment, and are not intended to limit the scope of another embodiment of the present disclosure. The terms of a singular form may include plural forms unless they have a clearly different meaning in the context. Otherwise indicated herein, all the terms used herein, which include technical or scientific terms, may have the same meanings that are generally understood by a person skilled in the art. In general, the terms defined in a dictionary should be considered to have the same meanings as the contextual meanings of the related art, and, unless clearly defined herein, should not be understood ideally or as having an excessively formal meaning. In any case, even the terms defined in the present disclosure cannot be interpreted as excluding an embodiment of the present disclosure.

For instance, electronic devices may include at least one of smartphones, tablet Personal Computers (PCs), mobile phones, video phones, electronic book (e-book) readers, desktop PCs, laptop PCs, netbook computers, workstations, servers, Personal Digital Assistants (PDAs), Portable Multimedia Players (PMPs), Moving Picture Experts Group Audio Layer 3 (MP3) players, mobile medical devices, cameras, and wearable devices (for example, smart glasses, Head-Mounted-Devices (HMDs), electronic garments, electronic bracelets, electronic necklaces, electronic appcessories, electronic tattoos, smart mirrors, and a smart watches).

In an embodiment of the present disclosure, an electronic device may be a smart home appliance. The smart home appliances may include at least one of, for example, televisions, Digital Video Disk (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to an embodiment of the present disclosure, an electronic device may include at least one of various medical devices supporting call forwarding service (for example, various portable measurement devices (for example, glucometers, heart rate meters, blood pressure meters, temperature meters, etc.), Magnetic Resonance Angiography (MRA) devices, Magnetic Resonance Imaging (MRI) devices, Computed Tomography (CT) devices, medical imaging devices, ultrasonic devices, etc.), navigation devices, Global Positioning System (GPS) receivers, Event Data Recorders (EDRs), Flight Data Recorders (FDRs), vehicle infotainment devices, marine electronic equipment (for example, marine navigation systems, gyro compasses, etc.), avionics, security equipment, vehicle head units, industrial or household robots, financial institutions' Automatic Teller Machines (ATMs), vendors' Point of Sale (POS) devices, or the Internet of Things (for example, light bulbs, various sensors, electric or gas meters, sprinkler systems, fire alarms, thermostats, street lights, toasters, exercise equipment, hot water tanks, heaters, boilers, etc.).

In an embodiment of the present disclosure, an electronic device may include at least one of part of furniture or buildings/structures, electronic boards, electronic signature receiving devices, projectors, and various measuring instruments (for example, water, electricity, gas, or radio signal measuring instruments). According to an embodiment of the present disclosure, an electronic device may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the development of technology.

Hereinafter, an electronic device according to an embodiment of the present disclosure will be described in more detail with reference to the accompanying drawings. The term "user" in the present disclosure may refer to a person using an electronic device or a device using an electronic device (for example, an artificial intelligent electronic device).

FIG. 1 is a block diagram of an electronic device management environment relating to a Subscriber Identification Module (SIM) according to an embodiment of the present disclosure.

Referring to FIG. 1, a management environment of an electronic device according to an embodiment of the present disclosure may include an electronic device 100, a network 162, a communication service provider device 200, a profile generation support device 210, and a profile transmission support device 300. According to an embodiment of the present disclosure, the communication service provider device 200 and the profile generation support device 210 may be integrated into one device. Alternatively, the communication service provider device 200, the profile generation support device 210, the profile transmission support device 300 may be integrated into one device. Alternatively, the profile generation support device 210 and the profile transmission support device 300 may be integrated into one device. When each of the configurations is integrated, a function of each device described below may be provided from one integrated device.

In an electronic device management environment of such a configuration, the electronic device 100 may collect SIM identification information (for example, an embedded Universal Integrated Circuit Card (eUICC) identification (ID) (EID)) of a SIM mounted in an embedded form (for example, an embedded SIM (eSIM) or an eUICC) and server identification information (for example, Subscription Manager Secure Routing (SM-SR) ID (SRID)) relating to the profile transmission support device 300. For example, the electronic device 100 may collect at least one of SIM ID information and server ID information (for example, server ID information relating to the access of the profile transmission support device 300) from at least one of information stored in a mounted SIM, an electronic device manufacturer server device, and a SIM manufacturer server device.

The electronic device 100 may provide, to a communication service provider, at least one of the obtained SIM ID information, server ID information, and device ID information (for example, International Mobile Equipment Identity (IMEI) or a serial number). The electronic device 100 may receive and install a profile that the profile generation support device 210 generates by using the information provided to the communication service provider, through the profile transmission support device 300. During the above operation, the electronic device 100 may search for an available communication service provider network by scanning for an available network and may receive and install a profile for using a corresponding communication service provider network on the basis of the transmission of the above ID information (for example, transmission via an Internet Protocol (IP) network). The profile may include information (for example, a protocol, a program, an instruction, an authentication key, an identifier, etc.) necessary for normal communication service use as the electronic device 100 accesses a communication service provider network.

In the above-mentioned electronic device management environment, the network 162 may support signal transmission/reception between the electronic device 100, the communication service provider device 200, the profile generation support device 210, and the profile transmission support device 300. For example, the network 162 may be a network established by a communication service provider in relation to communication service support. For example, the network 162 may be a network established by a communication service provider such as SKT, LGU, KT, Verizon, Orange, etc.

According to an embodiment of the present disclosure, the network 162 may include an IP network available for signal transmission between the electronic device 100, the communication service provider device 200, the profile generation support device 210, and the profile transmission support device 300. According to an embodiment of the present disclosure, the network 162 may deliver device unique information (or device ID information) of the electronic device 100 or SIM ID information to the communication service provider device 200 through a specific network (for example, an IP network).

According to an embodiment of the present disclosure, the network 162 may support a communication channel establishment between the communication service provider device 200 and a manufacturer server device. According to an embodiment of the present disclosure, the network 162 may support at least one of a communication channel establishment between the communication service provider device 200 and the profile generation support device 210, a communication channel establishment between the profile generation support device 210 and the profile transmission support device 300, and a communication channel establishment between the communication service provider device 200 and the electronic device 100.

The communication service provider device 200 may include a communication module capable of establishing a communication channel with a first network (for example, a cellular network), a provider server device connected to a cellular network, and a communication module capable of establishing a communication channel with a second network (for example, an IP network). The communication service provider device 200 may support a communication service management related registration (for example, subscription processing of users who want to subscribe to communication service) through an IP network. The communication service provider device 200 may perform various electronic device controls relating to service supports of users subscribed to communication service.

The communication service provider device 200 may provide a communication channel accessible through at least one of a cellular network and an IP network. The communication service provider device 200, for example, may provide an access channel of the electronic device 100 having an unregistered SIM through an IP network. The access channel may include a communication channel (for example, a communication channel established based on a temporary phone number assigned to an unregistered SIM) that the communication service provider device 200 provides in relation to an unregistered review registration.

According to an embodiment of the present disclosure, the communication service provider device 200 may receive device unique information (or SIM ID information additionally or in place of the unique information) from the electronic device 100. Alternatively, the communication service provider device 200 may receive server ID information of the profile transmission support device 300 that is to receive a profile from the electronic device 100. The communication service provider device 200 may provide, to the profile generation support device 210, at least one of server ID information, device unique information, SIM ID information, and information necessary for communication service registration of the electronic device 100.

The profile generation support device 210 may generate a profile relating to communication service management of the electronic device 100 on the basis of a minimum part of electronic device related information (for example, device unique information, SIM ID information, server ID information, etc.) provided from the communication service provider device 200. A profile generated by the profile generation support device 210 may be encrypted in relation to security. The profile generation support device 210 may receive a request relating to the generated profile transmission and may deliver it to the profile transmission support device 300 corresponding to the obtained server ID information. The profile generation support device 210 may deliver the profile to the electronic device 100 through the profile transmission support device 300.

The profile transmission support device 300 may establish a profile transmission related channel with the electronic device 100 in correspondence to the request of the profile generation support device 210. According to an embodiment of the present disclosure, the profile transmission support device 300 may transmit the profile to the electronic device 100 via an IP network. The profile transmission support device 300 may have unique server ID information. A specific SIM may install a profile received through the profile transmission support device 300 corresponding to the unique server ID information. Server ID information relating to the profile transmission support device 300 may be generated or managed by a SIM manufacturer or managed by an electronic device manufacturer.

The electronic device 100 may check which communication service provider network is available by using a specific communication module (for example, a cellular communication module). In relation to this, the electronic device 100 may perform a scan operation using a communication module. The electronic device 100 may provide a communication service provider selection function on the basis of communication service provider network information obtained through the scan operation. When an event occurs relating to communication service provider selection (or an input event is received), the electronic device 100 may access the communication service provider device 200 corresponding to selected information via an IP network (or a temporarily available cellular network). The electronic device 100 may provide at least one of device unique information and SIM ID information to the accessed communication service provider device 200. The electronic device 100 may receive a profile relating to corresponding service use from the communication service provider device 200 and may install it in a SIM.

According to an embodiment of the present disclosure, if only one communication service provider network is found, the electronic device 100 may automatically (or manually according to a user input) access (for example, access via an IP network or a temporarily accessible cellular network) the communication service provider device 200 relating to a corresponding communication service provider network and may transmit device unique information, SIM ID information, server ID information, etc.

Referring to FIG. 1, the electronic device 100 includes a bus 110, a processor 120, a memory 130, an input/output interface 140, a display 150, a communication interface 160, a provisioning manager 170, and a SIM 180. According to an embodiment of the present disclosure, the provisioning manager 170 may include the processor 120 and the communication interface 160.

The bus 110 is a circuit connecting the above-mentioned components and delivering a communication (for example, a control message, an input event, and data) between the above-mentioned components. For example, the bus 110 may deliver an input signal inputted from the input/output interface 140 to at least one of the processor 120 and the provisioning manager 170. The bus 110, for example, may deliver device unique information or SIM ID information of the electronic device 100 to the display 150. The bus 110 may deliver device unique information or SIM ID information to the communication interface 160.

The processor 120, for example, may receive an instruction from the above-mentioned other components (for example, the memory 130, the input/output interface 140, the display 150, the communication interface 160, the provisioning manager 170, etc.) through the bus 110. The processor 120 interprets a received instruction and may perform a calculation or process data according to the interpreted instruction. The processor 120 may include the provisioning manager 170. Alternatively, the processor 120 may be separate from the provisioning manager 170 and may be based on the bus 110 or in a form of directly performing a communication with the provisioning manager 170. Alternatively, the processor 120 may be disposed as a configuration of the provisioning manager 170.

According to an embodiment of the present disclosure, the processor 120 may perform signal processing relating to a profile installation of the SIM 180. For example, the processor 120 may perform signal processing relating to electronic device related information collection including at least one of device unique information and SIM related information (for example, at least one of SIM ID information and server ID information) and signal processing necessary for transmission processing of electronic device related information and profile reception control and installation control.

The memory 130 stores instructions or data received from the processor 120 or the other components (for example, the input/output interface 140, the display 150, the communication interface 160, the provisioning manager 170, etc.) or generated by the processor 120 or the other components. The memory 130 may store device unique information of the electronic device 100, for example, an International Mobile Station Equipment Identity (IMEI) 135 (or a serial number).

The IMEI 135 may be used for obtaining at least one of SIM ID information and server ID information. The IMEI 135 may be provided to the communication service provider device 200 in relation to a profile generation request. The memory 130, for example, may include programming modules such as a kernel 131, middleware 132, an Application Programming Interface (API) 133, or an application 134. Each of the above-mentioned programming modules may be configured with software, firmware, hardware, or a combination of at least two thereof.

The kernel 131 controls or manages system resources (for example, the bus 110, the processor 120, the memory 130, etc.) used for performing operations or functions implemented in the remaining other programming modules, for example, the middleware 132, the API 133, or the application 134. Additionally, the kernel 131 may provide an interface for allowing the middleware 132, the API 133, or the application 134 to perform a control or management in relation to a communication service provider network search function, information collection and transmission relating to the electronic device 100, and profile processing.

The middleware 132 serves as an intermediary role for exchanging data of the API 133 or the application 134 communicating with the kernel 131. Additionally, in relation to job requests received from the application 134, the middleware 132, for example, may perform a control (for example, scheduling or load balancing) for the job requests by using a method of assigning a priority for using a system resource (for example, the bus 110, the processor 120, the memory 130, etc.) of the electronic device 100 to at least one application among the application 134.

The API 133 may be an interface that the application 134 uses to control a function provided from the kernel 131 or the middleware 132. The API 133, for example, may include at least one interface or function (for example, an instruction) for file control, window control, image processing, or character control.

The application 134 may include at least one application relating to the management of the electronic device 100. For example, the application 134 may include an application relating to a camera function, a music playback function, a video playback function, a communication function, a recording function, a game function, a health care function, etc. According to an embodiment of the present disclosure, the application 134 may include an application relating to a communication service provider selection function. The application relating to a communication service provider selection function may include a program (for example, a data aggregate including at least one instruction, an instruction set, a program routine configured with at least one instruction, a template, a statement, etc.) relating to selectable communication service provider search, a program relating to the acquisition of electronic device related information (for example, device unique information, SIM ID information, and server ID information), a program relating to the reception and installation execution of a profile of a communication service provider selected based on electronic device related information, etc.

The input/output interface 140 delivers an instruction or data inputted from a user through an input/output device (for example, a key button, a touch key, a sensor, a keyboard, or a touch screen) to the processor 120, the memory 130, the communication interface 160, or the provisioning manager 170 through the bus 110. According to an embodiment of the present disclosure, the input/output interface 140 may perform an audio processing related function. In relation to this, the input/output interface 140 may include one or more of at least one of a speaker and a microphone. According to an embodiment of the present disclosure, the input/output interface 140 may output guide information on whether a profile is required (for example, whether a profile is in an uninstalled state) in relation to communication service support through a specific communication service provider network. The input/output interface 140 may generate an input event relating to a specific communication service provider item selection displayed on the display 150 in order to provide it to the provisioning manager 170. The input/output interface 140 may output selectable communication service provider information.

The display 150 displays various information (for example, multimedia data or text data). For example, the display 150 may output a lock screen and a standby screen. According to an embodiment of the present disclosure, the display 150 may output a menu, an icon, or a pop-up window relating to a communication service provider selection function. The display 150 may output selectable communication service provider information. The display 150 may output a screen relating to profile reception and installation in correspondence to a specific communication service provider selection. During this operation, the display 150 may output device unique information, SIM ID information, and server ID information, which are necessary for communication service provider network connection.

The communication interface 160 establishes communication between the electronic device 100 and an external device (for example, at least one of the communication service provider device 200, the profile generation support device 210, and the profile transmission support device 300). For example, the communication interface 160 may communicate with the external device connected to the network 162 (for example, a network that the communication service provider device 200 connects to or manages through wireless communication or wired communication. The wireless communication, for example, may include a cellular communication (for example, Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), or Global System for Mobile communications (GSM)). Additionally, the wireless communication may include Wireless Fidelity (WiFi), Bluetooth (BT), and Near Field Communication (NFC). The wired communication, for example, may include at least one of a Universal Serial Bus (USB), a High Definition Multimedia Interface (HDMI), the Recommended Standard 232 (RS-232), and a Plain Old Telephone Service (POTS), for example.

The communication interface 160 may be directly connected to the SIM 180. The communication interface 160 may deliver control signals and data of the provisioning manager 170 to the SIM 180. Additionally, the communication interface 160 may provide to the provisioning manager 170 at least one of SIM ID information and server ID information (for example, address information of the profile transmission support device 300 providing a profile) stored in the SIM 180 in accordance with a request of the provisioning manager 170. The communication interface 160 may establish a communication channel with the profile transmission support device 300 in correspondence to an operating system of the SIM 180 and may receive a profile relating to a communication service use of a specific communication service provider. The communication interface 160 may deliver the received profile to the SIM 180.

According to an embodiment of the present disclosure, the communication interface 160 may include at least one communication module capable of scanning networks of various communication service providers. For example, the communication interface 160 may include a first communication module accessible to (or connectable to or capable of establishing a communication channel with) a first communication service provider network and a second communication module accessible to a second communication service provider network. Additionally or alternatively, the communication interface 160 may further include various cellular communication available communication modules. Alternatively, the communication interface 160 may include one communication module capable of scanning a plurality of communication service provider networks. According to an embodiment of the present disclosure, the communication interface 160 may include a communication module connected to an IP network capable of transmitting electronic device related information to the communication service provider device 200.

The SIM 180, for example, may be inserted in an embedded form into the electronic device 100. Alternatively, the SIM 180 may be detachable and may be inserted into a slot formed in the electronic device 100. The SIM 180 according to an embodiment of the present disclosure may be mounted in the electronic device 100, in an unregistered state in relation to communication service management. Alternatively, the SIM 180 may be mounted in the electronic device 100, in a state that a profile relating to communication service management is uninstalled. The SIM 180 may receive and install a profile necessary for communication service use through the profile transmission support device 300. The SIM 180 may be connected to the provisioning manager 170 or the processor 120 through the communication interface 160. The SIM 180 may store SIM ID information (for example, Equipment Identity (EID)) and server ID information (for example, a Spatial Reference System Identifier (SRID)) according to a manufacturer's policy. Alternatively, the SIM 180 may be mounted in the electronic device 100, without storing at least one of SIM ID information (for example, EID) and server ID information (for example, an SRID).

In relation to the above-mentioned operation processing, the SIM 180 may include a SIM operating system relating to a profile installation, a security processing domain module (for example, Issuer Security Domain Root (ISD-R)), and a profile management module (for example, Issuer Security Domain Profile (ISD-P)). The security processing domain module may establish a session with the profile transmission support device 300 corresponding to specific server ID information according to a request of the provisioning manager 170. The security processing domain module may receive a profile through a session and install the received profile. In relation to this operation, the security processing domain module may perform the generation of a profile management module relating to specific profile management and the installation of a received profile.

The provisioning manager 170 performs a control relating to a communication service provider selection function and profile reception and installation of the electronic device 100. In relation to this, the provisioning manager 170 searches for a selectable communication service provider by controlling the communication interface 160. The provisioning manager 170 outputs a search result. If a communication service provider is selected, the provisioning manager 170 delivers electronic device related information to the communication service provider device 200 corresponding to the selected communication service provider. The provisioning manager 170 may request that the SIM 180 establish a session with the specified profile transmission support device 300 to support the profile installation.

According to an embodiment of the present disclosure, after providing a communication service provider selection screen, if a specific communication service provider is selected, the provisioning manager 170 checks whether there is SIM related information (for example, EID and SRID) in the SIM 180. If there is SIM related information, the provisioning manager 170 performs a control to output this to the display 150. According to an embodiment of the present disclosure, if there is no SIM related information in the SIM 180, the provisioning manager 170 performs a control to output information that requests the acquisition of device unique information (for example, an IMEI or a serial number) to the display 150. For example, the provisioning manager 170 may request the acquisition of printed code information (for example, a barcode or a Quick Response (QR) code) from the electronic device 100 in accordance with device unique information by performing the output of an input window for inputting device unique information or activating a camera. For example, a user may capture code information corresponding to device unique information disposed on a battery cover by using a camera. If device unique information is collected, the provisioning manager 170 may obtain SIM related information by providing corresponding information to a manufacturer server device. During this operation, the provisioning manager 170 may include an algorithm for interpreting code information and after converting the code information into text information, may provide the text information to a manufacturer server device. According to an embodiment of the present disclosure, when the communication service provider device 200 interoperates with a manufacturer server device, the provisioning manager 170 may transmit device unique information to the communication service provider device 200.

Figure 2:
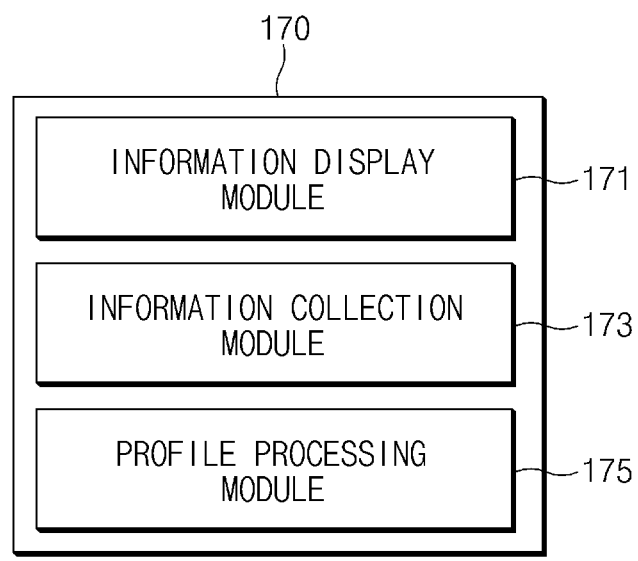
FIG. 2 is a block diagram of a provisioning manager according to an embodiment of the present disclosure.

FIG. 2 is a block diagram of a provisioning manager according to an embodiment of the present disclosure.

Referring to FIG. 2, the provisioning manager 170 includes an information display module 171, an information collection module 173, and a profile processing module 175.

The information display module 171 processes information collected and output relating to a communication service provider selection function. For example, if the electronic device 100 changes from a turn-off state to a turn-on state, the information display module 171 checks whether there is a profile relating to a registered communication service provider network in the SIM 180. If there is no profile relating to a registered communication service provider network in the SIM 180, the information display module 171 checks whether there is an accessible communication service provider network (for example, searches for a communication service provider network in the vicinity of the electronic device 100 by controlling the communication interface 160). If at least one accessible communication service provider network is found, the information display module 171 outputs a communication service provider selection screen to the display 150 on the basis of a search result.

According to an embodiment of the present disclosure, even if there is a specific communication service provider related profile in the SIM 180, the information display module 171 may search for an accessible communication service provider network. In relation to this, the information display module 171 may provide a menu or icon for executing a communication service provider selection function (for example, perform a control to output a menu or icon to display). When the execution of a corresponding function (for example, the communication service provider selection function) is requested, the information display module 171 searches for a communication service provider network. According to an embodiment of the present disclosure, if a state of the electronic device 100 changes (for example, changes from a turn-off state to a turn-on state), the information display module 171 automatically searches for a communication service provider network.

According to an embodiment of the present disclosure, the information display module 171 outputs a screen relating to the registration (for example, a specific communication service provider related profile installation) of the specific communication service provider device 200. The information display module 171 provides a communication service provider selection screen. If a specific item is selected from communication service provider items displayed on the display 150, the information display module 171 requests that the information collection module 173 collect device unique information, SIM ID information, server ID information, etc. If electronic device related information (for example, at least one of device unique information, SIM ID information, and server ID information of the profile transmission support device 300) is collected, the information display module 171 outputs the collected electronic device related information. The information display module 171 may provide a server device access screen managed by a SIM manufacturer or a server device access screen managed by an electronic device manufacturer providing server ID information, in relation to the server ID information collection.

If information collection is requested from the information display module 171, the information collection module 173 collects electronic device related information (for example, device unique information, SIM ID information, and server ID information). For example, the information collection module 173 may collect device unique information (for example, an IMEI or a serial number) stored in the memory 130 of the electronic device 100. According to an embodiment of the present disclosure, device unique information of the electronic device 100 may be printed on or engraved in the case of the electronic device 100 or printed on an additional sticker and attached to the case.

If device unique information is not stored in the memory 130 but is disposed on a case, the information collection module 173 may provide various interfaces for device unique information acquisition. For example, the information collection module 173 may output a device unique information input window for device unique information acquisition. A user may perform a device unique information input through the device unique information input window. As another example, the information collection module 173 may operate a camera module for device unique information acquisition. The information collection module 173 may obtain device unique information on the basis of information (for example, information obtained from an image through text recognition) inputted through a camera module.

The SIM ID information (for example, EID) may be stored in the SIM 180. Accordingly, the information collection module 173 may request the SIM ID information (for example, EID) from the SIM 180 to obtain it. Alternatively, if SIM ID information is stored and managed in an additional management server device (for example, a server device managing SIM related information such as a SIM manufacturer server device or an electronic device manufacturer server device), the information collection module 173 may obtain SIM ID information on the basis of the device unique information of the electronic device 100. In relation to this, the information collection module 173 may access a management server device by using an additional network (for example, a WiFi based communication network connected to an IP network connected to a server device for managing SIM ID information or a short-range communication network connected with another electronic device connected to an IP network) of the electronic device 100. The information collection module 173 may provide device unique information and may obtain SIM ID information or server ID information allocated to a corresponding electronic device.

If SIM ID information is obtained from the mounted SIM 180, the information collection module 173 may collect server ID information (for example, SRID) on the basis of the obtained device unique information or SIM ID information. In relation to this, the information collection module 173 may obtain server ID information relating to the corresponding SIM 180 as a SIM manufacturer accesses a server device managed by a SIM manufacturer on the basis of temporary connection information (for example, information for accessing a corresponding server device in relation to the SKID acquisition) stored in the SIM 180.

According to an embodiment of the present disclosure, the information collection module 173 obtains server ID information by accessing (for example, access based on access information written in the electronic device 100 through an electronic device manufacturer or access information written in the SIM 180) a server device managed by an electronic device manufacturer. In this case, a server device of an electronic device manufacturer may store and manage server ID information of the SIM 180 mounted in a specific electronic device. According to an embodiment of the present disclosure, the server ID information may be obtained by the communication service provider device 200. In this case, the information collection module 173 may provide (for example, provide based on access through an IP network or access and provide on the basis of temporary connection information) device unique information or SIM ID information to the communication service provider device 200.

The profile processing module 175 supports profile reception and processing relating to communication service use of a specific communication service provider. For example, if a specific communication service provider is selected, the profile processing module 175 establishes a connection with a network managed by a corresponding communication service provider and provides device unique information or SIM ID information to the communication service provider device 200 on the basis of the network connection. If server ID information is obtained during this operation, the profile processing module 175 provides the server ID information to the communication service provider device 200. If server ID information is not obtained, the profile processing module 175 requests the acquisition of the server ID information from the communication service provider device 200 while providing device unique information and SIM ID information to the communication service provider device 200. The communication service provider device 200 obtains server ID information corresponding to corresponding device unique information and SIM ID information from a server device (for example, a SIM manufacturer server device or an electronic device manufacturer server device) providing the server ID information.

The profile processing module 175 may receive a request relating to profile reception from at least one of the communication service provider device 200, the profile generation support device 210, and the profile transmission support device 300. If a profile reception related request is received, the profile processing module 175 requests that the SIM 180 establish a session with the profile transmission support device 300. In relation to this, the profile processing module 175 establishes a communication channel with the profile transmission support device 300 on the basis of the obtained server ID information. Alternatively, the profile processing module 175 may establish a communication channel with the profile transmission support device 300 by obtaining server ID information from the communication service provider device 200. The profile processing module 175 may request that the SIM 180 establishes a session relating to profile reception with the profile transmission support device 300. Once the session is established, the communication service management related profile of a specific communication service provider is delivered to the SIM 180 through the communication interface 160. If a specific profile installation to the SIM 180 is completed, the profile processing module 175 requests information corresponding thereto from the information display module 171.

As mentioned above, according to an embodiment of the present disclosure, an electronic device 100 may include a communication interface for searching for an accessible communication service provider network on the basis of a SIM where a profile relating to a communication service connection provided from at least one communication service provider network is not installed, a provisioning manager for collecting at least one communication service provider information on the basis of the found communication service provider network, and a display for outputting the collected communication service provider information.

According to an embodiment of the present disclosure, when receiving a specific communication service provider item selection, the provisioning manger may be configured to collect the electronic device related information and transmit the collected electronic device related information to a communication service provider device 200 corresponding to the selected communication service provider item.

According to an embodiment of the present disclosure, the provisioning manager may be configured to collect at least one of unique information of the electronic device 100, SIM ID information of a SIM, and server ID information of a device for supporting profile transmission.

According to an embodiment of the present disclosure, the provisioning manager may be configured to collect the SIM ID information or server ID information stored in the SIM.

According to an embodiment of the present disclosure, the provisioning manager 170 may be configured to transmit the device unique information of the electronic device 100 to a management server device for managing SIM related information and receive the SIM ID information or the server ID information from the management server device.

According to an embodiment of the present disclosure, the provisioning manager 170 may control the reception of a profile that the communication service provider requests to be generated.

According to an embodiment of the present disclosure, the provisioning manager 170 may perform a control to allow the SIM to establish a session with a profile transmission support device 300 corresponding to the server ID information and allow the SIM to receive a profile from a profile generation support device 210 that generates the profile through the session.

According to an embodiment of the present disclosure, the provisioning manager 170 performs a control to install the received profile in the SIM.

According to an embodiment of the present disclosure, the provisioning manager 170 performs a control to search for an accessible communication service provider network if the electronic device 100 changes from a turn-off state to a turn-on state or may perform a control to search for an accessible communication service provider network in accordance with a communication service provider change request reception.

According to an embodiment of the present disclosure, the provisioning manager 170 performs a control to separate available communication service provider information from an uninstalled profile related communication service provider item by a profile pre-installed on the SIM and then output them.

According to an embodiment of the present disclosure, the provisioning manager 170 may perform a control to obtain SIM related information from the SIM or an external server device that manages SIM related information in correspondence to an input event and display the SIM related information.

According to an embodiment of the present disclosure, the provisioning manager 170 may perform a control to output text information corresponding to the SIM related information or output specific code information corresponding to the SIM related information.

Figure 3:
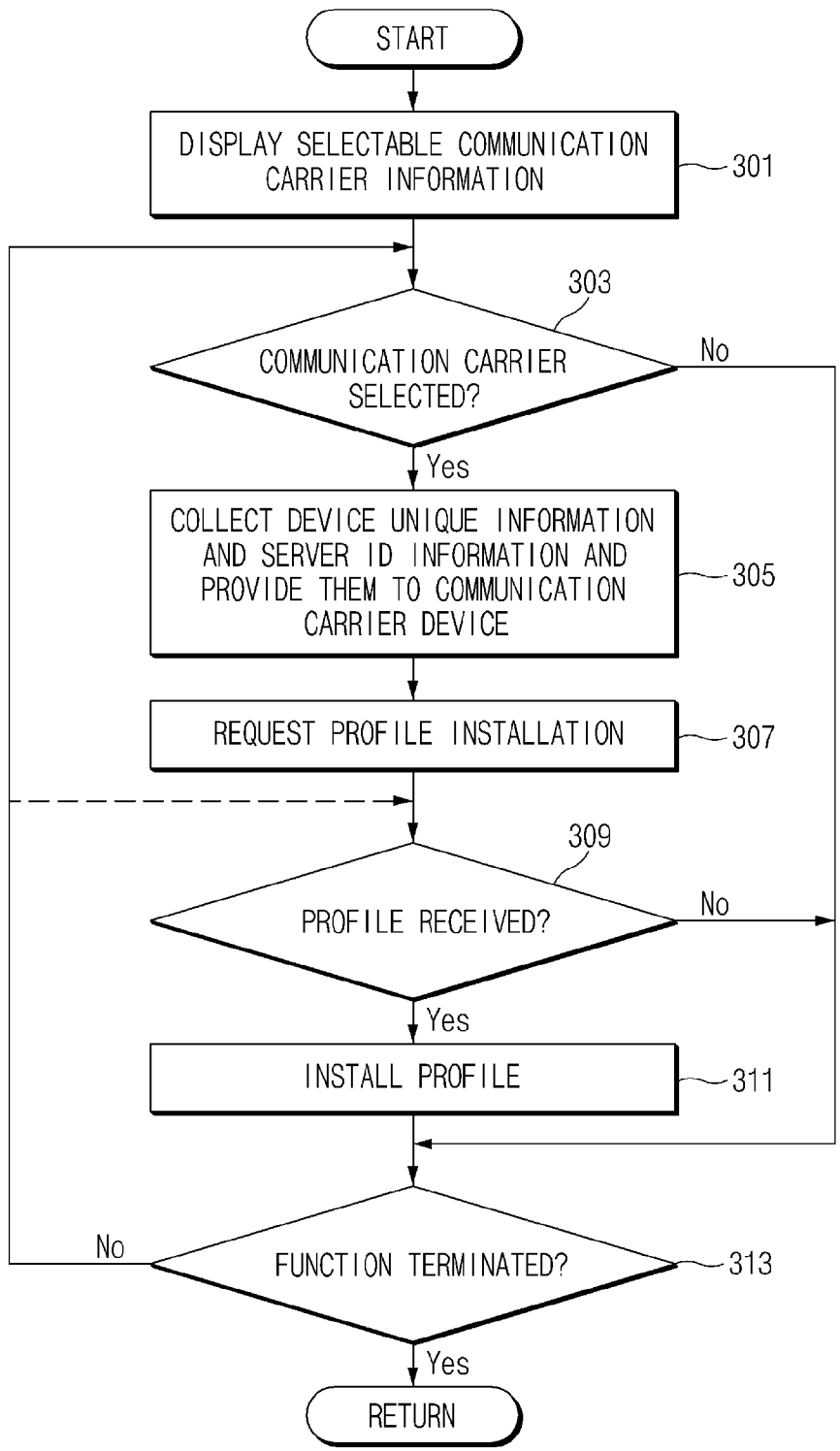
FIG. 3 is a flowchart of an electronic device management method relating to communication service provider selection according to an embodiment of the present disclosure.

FIG. 3 is a flowchart of an electronic device management method relating to communication service provider selection according to an embodiment of the present disclosure.

Referring to FIG. 3, in relation to the electronic device management method, the provisioning manager 170 may perform a display of selectable communication service provider information step 301. In relation to this, the provisioning manager 170 searches for an accessible communication service provider network at a specific given position by using at least one communication module included in the communication interface 160. The provisioning manager 170 may perform a communication service provider information display by distinguishing an already registered communication service provider network from an unregistered communication service provider network. Alternatively, the provisioning manager 170 may display communication service provider information corresponding to an unregistered communication service provider network.

In step 303, the provisioning manager 170 checks an input event occurrence relating to communication service provider selection. If there is no event occurrence relating to communication service provider selection, the provisioning manager 170 skips the following operations and proceeds to step 303. For example, if there is no event occurrence relating to communication service provider selection within a specific time or there is a cancel input event, the provisioning manger 170 may terminate a communication service provider selection related screen.

If there is an event relating to communication service provider selection that occurs, the provisioning manager 170 collects electronic device related information necessary for the reception of a profile installed on the SIM 180 in relation to communication service use in step 305. For example, the provisioning manager 170 collects at least one of device unique information, SIM ID information, and service ID information (for example, SRID) and provides it to the selected communication service provider device 200 or the profile generation support device 210. Herein, the provisioning manager 170 provides the SIM ID information (for example, EID) to the communication service provider device 200 or the profile generation support device 210.

According to an embodiment of the present disclosure, the provisioning manager 170 collects SIM ID information and server ID information by using the above-mentioned management server device (for example, a SIM manufacturer server device or an electronic device manufacturer server device for managing at least one of SIM ID information and server ID information) on the basis of device unique information in step 305. Alternatively, if only the SIM ID information is stored in the SIM 180, the provisioning manager 170 collects service ID information by providing device unique information and SIM identification information to a management server device. According to an embodiment of the present disclosure, the provisioning manager 170 provides (for example, provide in access using an IP network) device unique information and SIM ID information to a communication service provider device (or the profile generation support device 210) and requests that the communication service provider device 200 obtains server address information from a management server device.

In step 307, the provisioning manager 170 performs a profile installation request. For example, the provisioning manager 170 receives a profile reception related message from at least one of the communication service provider device 200, the profile generation support device 210, and the profile transmission support device 300. If a profile reception is requested, the provisioning manager 170 requests a session establishment relating to profile reception from the SIM 180. The SIM 180 may process a profile reception operation relating to a corresponding communication service provider through the provisioning manager 170.

In step 309, the provisioning manager 170 checks whether the profile reception is completed and processes an information display during reception or upon reception completion. In step 311, the SIM 180 of the electronic device 100 performs processing relating to the installation of the received profile. The provisioning manager 170 receives information on a profile installation from the SIM 180 and performs information display for the information reception.

In step 313, the provisioning manager 170 checks whether a function termination event relating to profile installation occurs. During function termination, the provisioning manager 170 may enter a function management operation of the electronic device 100 or may support function processing according to a sleep mode or a user determined schedule. According to an embodiment of the present disclosure, when an event relating to another communication service provider selection and profile installation occurs, the provisioning manager 170 proceeds to step 303 to re-perform the subsequent steps. For example, the provisioning manager 170 provides a menu screen relating to communication service provider change. If an event relating to change occurs, the provisioning manager 170 proceeds to step 303 to re-perform the subsequent steps. According to an embodiment of the present disclosure, if the profile reception is not completed, the provisioning manager 170 proceeds to step 309 to re-perform the subsequent steps.

Figure 4:
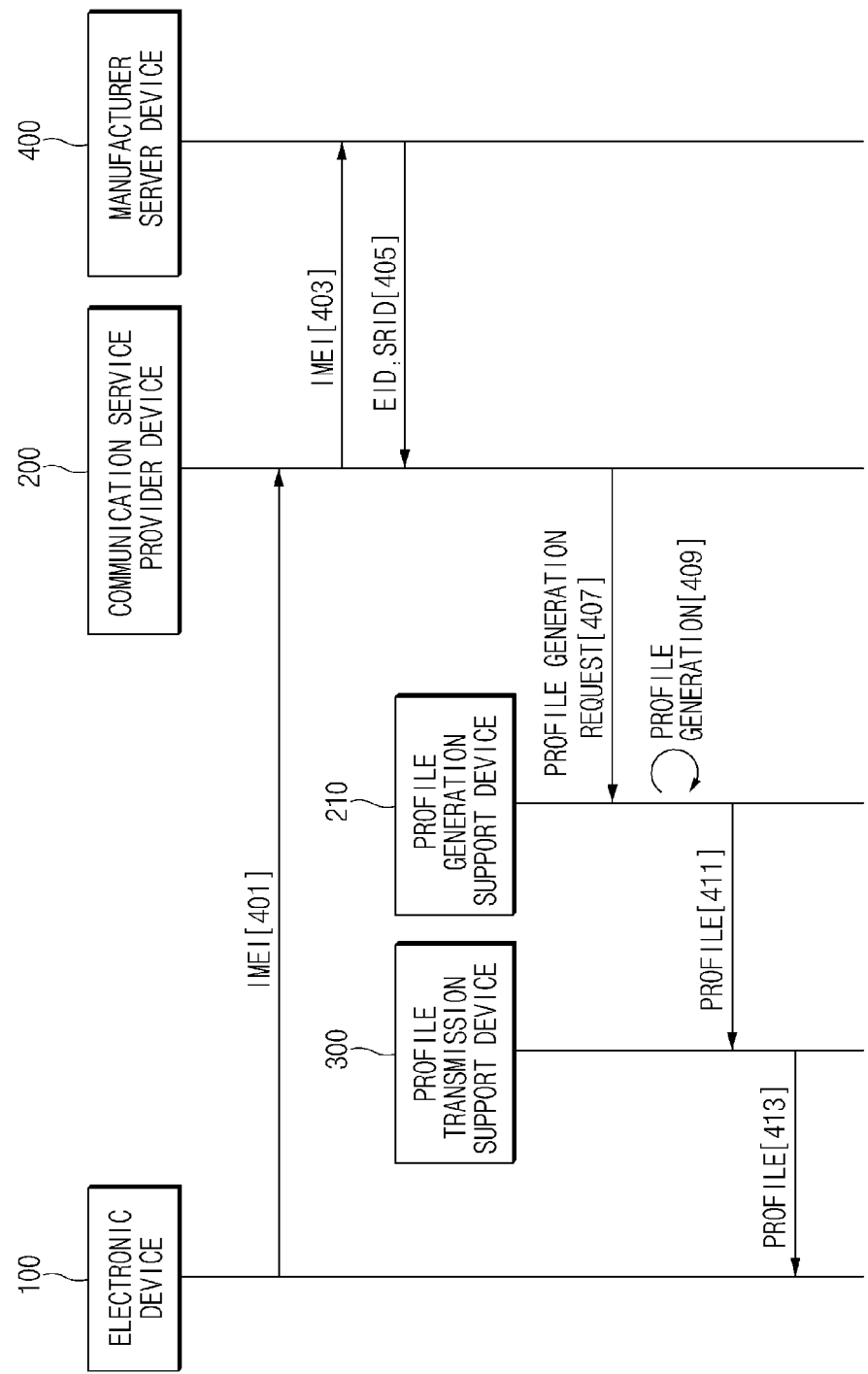
FIG. 4 is a flow diagram of a profile installation of an electronic device according to an embodiment of the present disclosure.

FIG. 4 is a flow diagram of a profile installation of an electronic device according to an embodiment of the present disclosure.

Referring to FIG. 4, according to an embodiment of the present disclosure, in relation to the electronic device related information acquisition, the electronic device 100 delivers device unique information (for example, IMEI) of the electronic device 100 to a communication service provider device 200 in step 401. In relation to this, the electronic device 100 establishes a communication channel through a network (for example, an IP network) connected to the communication service provider device 200 and provides the device unique information to the communication service provider device 200.

In step 403, the communication service provider device 200 provides the device unique information provided from the electronic device 100 to a manufacturer server device 400. The manufacturer server device 400, for example, may be a server device for managing SIM ID information or server ID information of a SIM mounted in the electronic device 100 having specific device unique information.

In step 405, the manufacturer server device 400 provides, to the communication service provider device 200, SIM ID information (for example, EID) or server ID information (for example, SRID) mapped into the device unique information. During the above-mentioned step, the communication service provider device 200 and the manufacturer server device 400 may be connected through a wired/wireless IP network. According to an embodiment of the present disclosure, the manufacturer server device 400 may be integrated into the communication service provider device 200.

In step 407, the communication service provider device 200 requests profile generation while providing at least one of the obtained device unique information, SIM ID information, and service ID information to the profile generation support device 210 (for example, an SM-DP device). In step 409, the profile generation support device 210 generates a profile relating to communication service management of the electronic device 100 on the basis of the received device unique information, SIM ID information, server ID information, and unique information of the communication service provider device 200. In step 411, the profile generation support device 210 provides the generated profile to the profile transmission support device 300 (for example, an SM-SR device) corresponding to the server identification information. In step 413, the profile transmission support device 300 provides a specific profile to the electronic device 100. During this step, the profile transmission support device 300 establishes a session with the SIM 180 of the electronic device 100 and transmits a profile through the established session.

Figure 5:
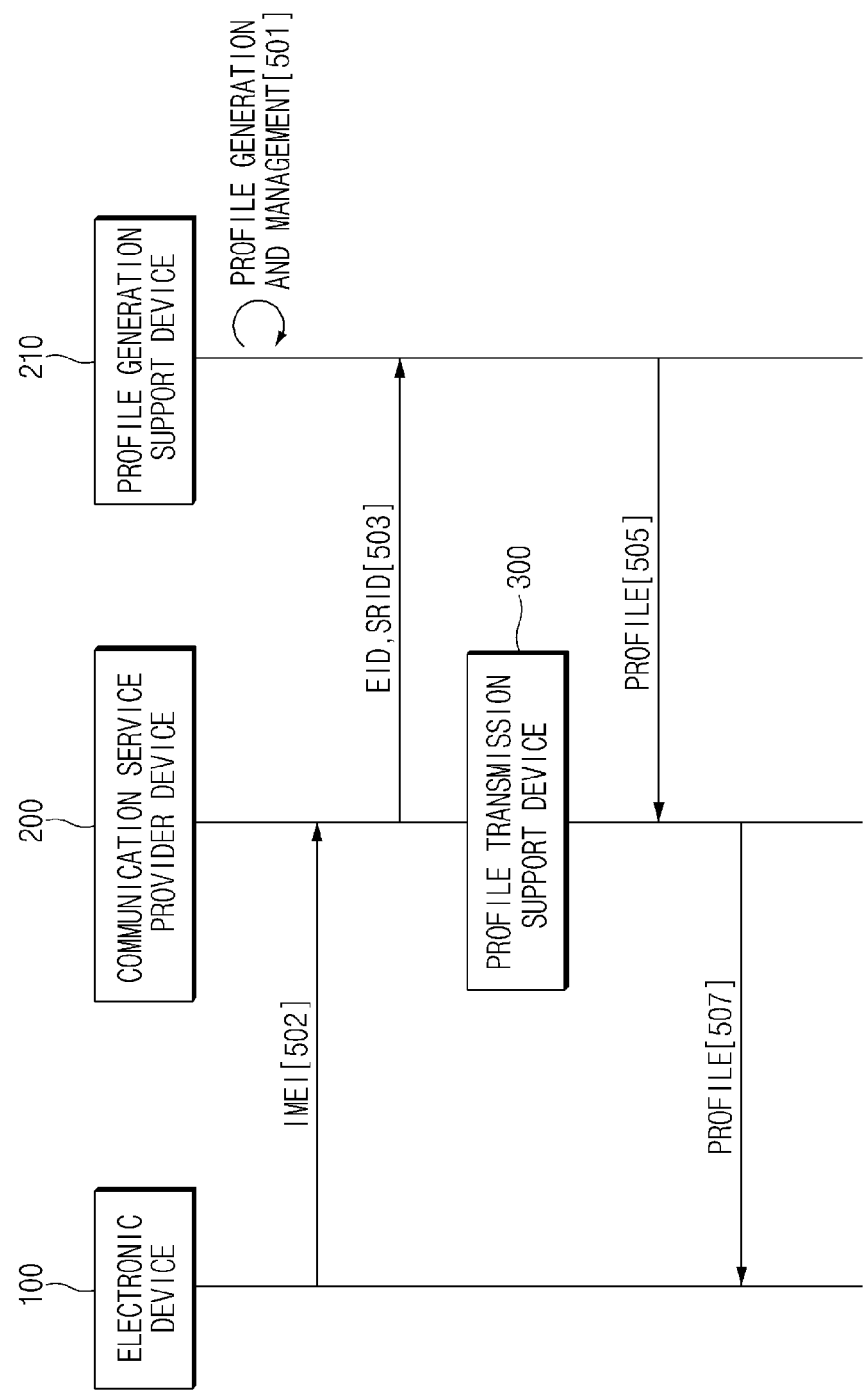
FIG. 5 is a flow diagram of a profile installation of an electronic device according to an embodiment of the present disclosure.

FIG. 5 is a flow diagram of a profile installation of an electronic device according to an embodiment of the present disclosure.

Referring to FIG. 5, according to an embodiment of the present disclosure, a profile generation support device 210 generates at least one profile to store and manage in step 501. During this step, the profile generation support device 210 generates a profile according to a request of a communication service provider device 200 or a specified policy.

In step 502, the electronic device 100 requests a profile download while providing device unique information (for example, an IMEI or a serial number) to the communication service provider device 200. The communication service provider device 200 obtains SIM related information (for example, EID or SRID) corresponding to device unique information and delivers the obtained SIM related information to the profile generation support device 210.

In step 505, the profile generation support device 210 delivers a pre-generated profile to the profile transmission support device 300. In step 507, the profile transmission support device 300 transmits a profile to the electronic device 100. According to an embodiment of the present disclosure, the profile generation support device 210 delivers a profile transmission request to the profile transmission support device 300 without transmitting a profile to the profile transmission support device 300 in step 505. Then, the profile transmission support device 300 establishes a session with the electronic device 100 and provides a tunneling channel between the profile generation support device 210 and the electronic device 100. The profile transmission support device 300 transmits a profile to the electronic device 100 through the corresponding tunneling channel.

According to an embodiment of the present disclosure, the profile generation support device 210 generates and stores at least one or a plurality of profiles in advance, and when receiving EID and SRID from the communication service provider device 200 in step 503, changes a profile to correspond to corresponding SIM related information and then transmits a corresponding profile to the electronic device 100 through the profile transmission support device 300.

According to an embodiment of the present disclosure, when receiving device unique information from the electronic device 100 in step 502, the communication service provider device 200 performs an operation for obtaining SIM related information relating to the electronic device 100. For example, as described with reference to FIG. 4, the communication service provider device 200 obtains EID and SRID values by interoperating with the manufacturer server device 400. During this step, the communication service provider device 200 provides an input value (e.g., an IMEI or a serial number of the electronic device 100) to the manufacturer server device 400 on the basis of the Simple Object Access Protocol (SOAP) or the Representational State Transfer (RESTful) protocol. In relation to this, the manufacturer server device 400 delivers an output value (e.g., EID & SRID) to the communication service provider device 200.

According to an embodiment of the present disclosure, the communication service provider device 200 or an electronic device for communication service subscription connected to the communication service provider device 200 provides a POS screen and if EID and SRID values are inputted, the communication service provider device 200 obtains EID and SRID. The electronic device for communication service subscription may be an electronic device distributed to an agency relating to the communication service provider device 200. In relation to this, if EID and SRID values stored in the SIM 180 of the electronic device 100 are manually inputted to the electronic device for communication service subscription in an offline environment, the inputted information may be provided to the communication service provider device 200.

According to an embodiment of the present disclosure, in relation to the EID and SRID check, the electronic device 100 may output an EID value and an SRID value stored in the SIM 180 to the display 150 or as the electronic device for communication service subscription and the electronic device 100 are connected through communication, the electronic device 100 may automatically transmit the information of the SIM 180 to the electronic device for communication service subscription. In relation to the above-mentioned operation support, the SIM 180 may include a function for outputting or transmitting an EID value and an SRID value to the display 150 in correspondence to an external input (for example, a menu selection or a request message of the electronic device for communication service subscription). In a situation where the EID value and the SRID value are outputted to the display 150, the EID value and the SRID value may be inputted to the electronic device for communication service subscription by using an input device (for example, a keyboard) of the electronic device for communication service subscription).

According to an embodiment of the present disclosure, the electronic device 100 outputs information in a barcode or a QR code form. The electronic device for communication service subscription may include a device (for example, a reader) for reading a barcode or a QR code. The electronic device for communication service subscription obtains an EID value and an SRID value from information (for example, the barcode or the QR code) displayed on the display 150 of the electronic device 100 by using the reader. Alternatively, an EID value and an SRID value may be printed on the electronic device 100 and in this case, the electronic device for communication service subscription may obtain the EID value and the SRID value by using a code reading device (for example, a scanner and a camera). The electronic device for communication service subscription transmits the obtained EID value and SRID value to the communication service provider device 200.

The electronic device for communication service subscription collects EID and SRID values through the communication service provider device 200 or a server page provided from a server device (for example, a web portal) linked to the communication service provider device 200 and provides these to the communication service provider device 200. In relation to this, a server page (for example, a web portal screen) provides an input window for inputting an IMEI or a serial number of the electronic device 100. The communication service provider device 200 receives an EID value and an SRID value inputted manually by the electronic device 100 for communication service subscription on a server page or may receive bar code or QR code values corresponding to the EID value and the SRID value.

Figure 6:
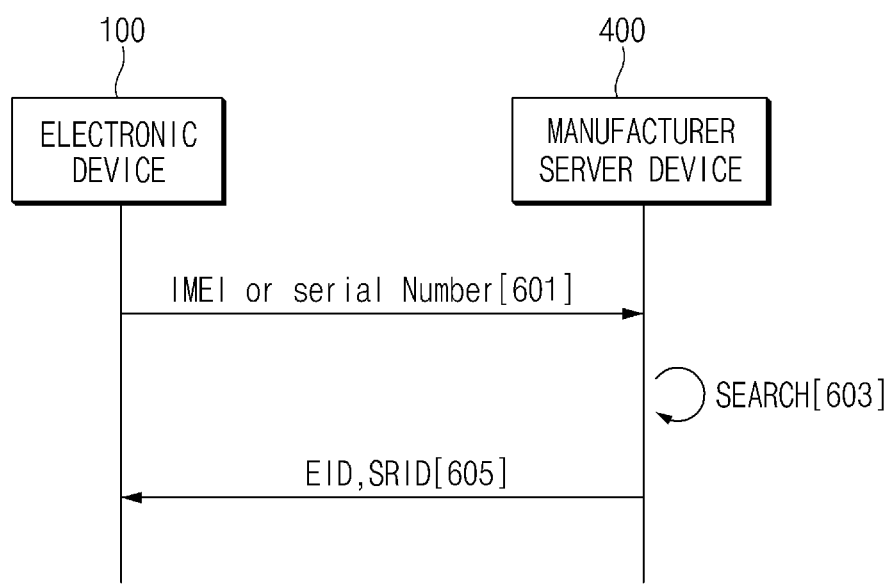
FIG. 6 is a flow diagram relating to server ID information acquisition according to an embodiment of the present disclosure.

FIG. 6 is a flow diagram relating to server ID information acquisition according to an embodiment of the present disclosure.

Referring to FIG. 6, according to an embodiment of the present disclosure, in relation to the server ID information acquisition, the electronic device 100 provides device unique information (for example, an IMEI or a serial number) to the manufacturer server device 400 in step 601. The manufacturer server device 400 may store and manage a database for providing SIM related information (for example, SIM ID information and server ID information) on the basis of device unique information. In relation to this, although it is described with reference to FIG. 6 that a device for providing SIM related information is referred to as the manufacturer server device 400, embodiments of the present disclosure are not limited thereto. For example, at least one of the communication service provider device 200, the profile generation support device 210, the profile transmission support device 300, a SIM manufacturer server device, and an electronic device manufacturer device may store and manage the SIM related information. Accordingly, the manufacturer server device 400 may be replaced by a device for storing and managing SIM related information.

If receiving device unique information from the electronic device 100, the manufacturer server device 400 searches for SIM ID information or server ID information corresponding to the device unique information in step 603. In relation to this, the manufacturer server device 400 may refer to a database where SIM related information is mapped into device unique information. If SIM ID information and server ID information are found, the manufacturer server device 400 transmits the SIM ID information and the server ID information to the electronic device 100 in step 605.

As mentioned above, according to an embodiment of the present disclosure, a SIM management method may include searching for an accessible communication service provider network on the basis of a SIM where a profile relating to a communication service connection provided from at least one communication service provider network is not installed, collecting at least one communication service provider information on the basis of the found communication service provider network, and outputting the collected communication service provider information.

According to an embodiment of the present disclosure, the method may further include receiving a specific communication service provider item selection, collecting the electronic device related information in correspondence to the selection reception, and transmitting the collected electronic device related information to a communication service provider device corresponding to the selected communication service provider item.

According to an embodiment of the present disclosure, collecting the electronic device related information may include collecting at least one of device unique information, SIM ID information, and server ID information of a device for supporting profile transmission.

According to an embodiment of the present disclosure, collecting the electronic device related information may include collecting the SIM ID information or server ID information written in the SIM.

According to an embodiment of the present disclosure, collecting the electronic device related information may include transmitting the device unique information of the electronic device to a management server device for managing SIM related information and receiving the SIM ID information or the server ID information from the management server device.

According to an embodiment of the present disclosure, the method may further include receiving a profile that the communication service provider device requests to be generated.

According to an embodiment of the present disclosure, the method may further include establishing a session between the SIM and a profile transmission support device corresponding to the server ID information and receiving, by the SIM, a profile from a profile generation support device that generates the profile, through the session.

According to an embodiment of the present disclosure, the method may further include installing the received profile to the SIM.

According to an embodiment of the present disclosure, searching for the accessible communication service provider network may include searching for the accessible communication service provider network if the electronic device changes from a turn-off state to a turn-on state and searching for the accessible communication service provider network in accordance with the reception of a communication service provider change request.

According to an embodiment of the present disclosure, outputting the collected communication service provider information may include separating available communication service provider information from an uninstalled profile related communication service provider item by a profile pre-installed on the SIM and then outputting them.

According to an embodiment of the present disclosure, the method may include obtaining SIM related information from the SIM or an external server device that manages SIM related information in accordance with an input event and displaying the SIM related information.

According to an embodiment of the present disclosure, displaying the SIM related information may include at least one of outputting text information corresponding to the SIM related information and outputting specific code information (for example, a bar code, a QR code, etc.) corresponding to the SIM related information.

Figure 7:
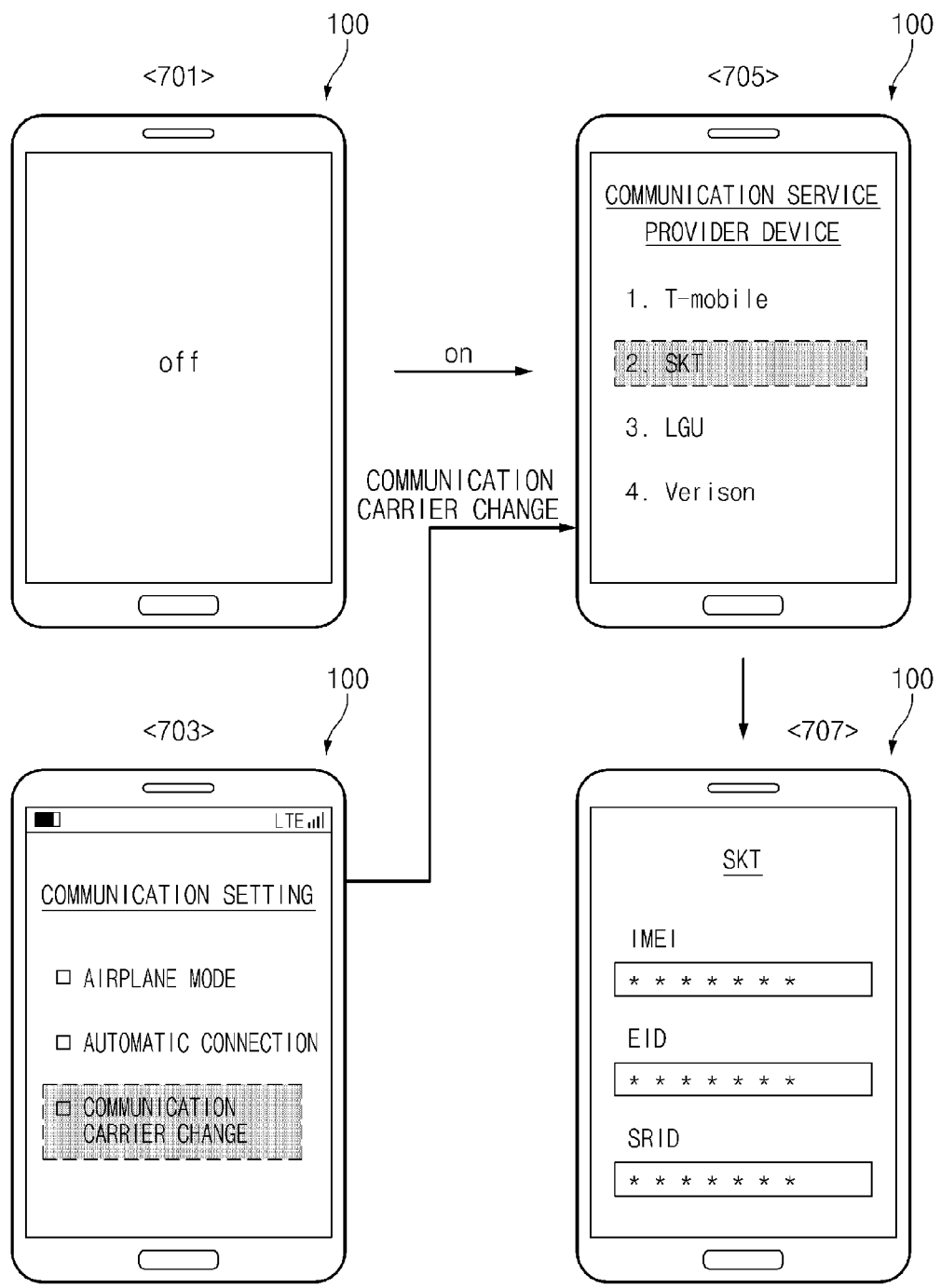
FIG. 7 is an illustration relating to a communication service provider selection according to an embodiment of the present disclosure.

FIG. 7 is an illustration relating to a communication service provider selection according to an embodiment of the present disclosure.

Referring to FIG. 7, according to an embodiment of the present disclosure, as shown in a state 701, the electronic device 100 may have a turn-off state. If an event (for example, a power key input event, etc.) relating to an occurrence of a turn-on request, the electronic device 100 performs booting. The electronic device 100 checks whether there is an accessible communication service provider network by controlling the communication interface 160 during the booting process. If there is an accessible communication service provider network, the electronic device 100 collects corresponding communication service provider information. The electronic device 100 outputs a communication service provider selection screen as shown in state 705 on the basis of the collected communication service provider information. For example, the electronic device 100 may output a selection screen for selecting a plurality of communication service providers. According to an embodiment of the present disclosure, if there is an accessible communication service provider network, the electronic device 100, as shown in state 705, outputs a communication service provider selection screen. Alternatively, if there is an accessible communication service provider network, the electronic device 100 may process an operation relating to a profile reception and installation of a communication service provider without a communication selection screen output.

According to an embodiment of the present disclosure, the electronic device 100 may check whether there is a profile stored in the SIM 180 during the booting process. The electronic device 100 may separate accessible communication service provider information from registered communication service provider information (for example, a state that a specific communication service provider related profile is installed) and then output them. During this step, the electronic device 100 may perform a communication connection on a registered communication service provider network. Then, the electronic device 100 may install another communication service provider related profile in correspondence to a user selection and access a corresponding communication service provider network.

According to an embodiment of the present disclosure, the electronic device 100 may output a screen relating to a communication setting in a turn-on state as shown in state 703. During this state, the SIM 180 of the electronic device 100 may have a state that an additional profile is not installed. Alternatively, the SIM 180 of the electronic device 100 may have a state that a profile relating to a specific communication service provider is installed. The electronic device 100 may output a communication setting screen relating to a communication service provider change. If a communication service provider change item is selected from a communication setting screen, the electronic device 100 searches for an accessible communication service provider network. The electronic device 100 outputs a communication service provider selection screen as shown in the state 705 on the basis of the found communication service provider information.

In state 705, if a specific communication service provider item (e.g. a communication service provider item that a communication service provider related profile is not installed on the SIM 180 is selected), the electronic device 100 requests that the corresponding communication service provider 200 generate a profile through an IP network. The communication service provider device 200 may request electronic device related information from the electronic device 100 in relation to profile generation. For example, the electronic device 100, as shown in state 707, may output an input window for inputting electronic device related information. A corresponding input window may be a server page that the communication service provider device 200 provides. Once electronic device related information (for example, IMEI, EID, and SRID) is collected, the communication service provider device 200 provides corresponding information to the profile generation support device 210 to request profile generation.

According to an embodiment of the present disclosure, a screen provided in state 707 may be a screen for obtaining at least one of SIM ID information and server ID information. As described above, the electronic device 100 may transmit device unique information to the manufacturer server device 400 to request SIM ID information or server ID information. Accordingly, the screen provided in state 707 may include a server page providing SIM ID information or server ID information that the manufacturer server device 400 allocates to specific device unique information.

The term "module" used in the present disclosure, for example, may refer to a unit including a combination of at least one of hardware, software, and firmware. The terms "module," "unit," "logic," "logical block," "component," or "circuit" may be interchangeably used. The term "module" may be a minimum unit or part of an integrally configured component. The term "module" may refer to a minimum unit performing at least one function or part thereof.

According to an embodiment of the present disclosure, at least part of a device (for example, modules or functions thereof) or a method (for example, operations) according to the present disclosure, for example, as in a form of a programming module, may be implemented using an instruction stored in an non-transitory computer-readable storage media. When at least one processor executes an instruction, it may perform a function corresponding to the instruction.

According to an embodiment of the present disclosure, in relation to a storage medium that stores at least one non-transitory computer readable instruction, the instruction may be configured to be executed by at least one processor (or a processor corresponding to a provisioning manager) and the instruction may be configured to search for an accessible communication service provider network on the basis of a SIM where a profile relating to a communication service connection of at least one communication service provider network is not installed and collect at least one communication service provider information on the basis of the found communication service provider network.

According to an embodiment of the present disclosure, an electronic device may include a memory storing at least one instruction and a provisioning manager connected to the memory, and the instruction relating to the operation performance of the provisioning manager may be configured to search for an accessible communication service provider network on the basis of a SIM where a profile relating to a communication service connection of at least one communication service provider network is not installed and collect at least one communication service provider information on the basis of the found communication service provider network.

According to an embodiment of the present disclosure, communication service providers may be selected or changed according to a user preference.

The non-transitory computer-readable storage media may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and a hardware device especially configured to store and perform a program instruction (for example, a programming module) such as a Read Only Memory (ROM), a Random Access Memory (RAM), and a flash memory. Additionally, a program instruction may include high-level language code executable by a computer using an interpreter in addition to machine code generated by a complier. The hardware device may be configured to operate as at least one software module to perform an operation of an embodiment of the present disclosure and vice versa.

According to an embodiment of the present disclosure, in relation to a storage medium that stores instructions, when executed by at least one processor, the instructions are configured to allow the at least one processor to perform at least one operation and the at least one operation may include searching for an accessible communication service provider network on the basis of a SIM where a profile relating to a communication service connection provided from at least one communication service provider network is not installed, collecting at least one communication service provider information on the basis of the found communication service provider network, and outputting the collected communication service provider information.

Embodiments of the present disclosure disclosed in the present disclosure and the accompanying drawings are provided as examples to describe technical content and facilitate understanding but are not intended to limit the scope of the present disclosure. Accordingly, it should be construed that besides the embodiments of the present disclosure listed herein, all modifications or modified forms derived based on the technical ideas of the present disclosure are included within the scope of the present disclosure, as defined by the appended claims and their equivalents.

What is claimed is:

1. An electronic device, comprising:
    a subscriber identification module (SIM);
    a memory configured to store at least one instruction; and
    a processor connected to the memory and the SIM, and configured to execute the at least one instruction to search for an accessible communication service provider based on at least one wireless communication module, collect information on the accessible communication service provider, and output the collected information,
    wherein a profile relating to the accessible communication service provider is not installed in the SIM, and
    wherein the at least one instruction further comprises to separate information of the accessible communication service provider from an uninstalled profile related to the accessible communication service provider by a profile present in the SIM in order of output and to display the separated information.

2. The electronic device of claim 1, wherein the at least one instruction comprises:
    when a selection of a communication service provider is received, to collect and transmit electronic device information corresponding to the selected communication service provider to the selected communication service provider.

3. The electronic device of claim 2, wherein collecting electronic device related information device unique information of the electronic device, SIM identification information of the SIM, and server identification information of a device supporting profile transmission.

4. The electronic device of claim 3, wherein the at least one instruction comprises at least one of:
    an instruction to collect the SIM identification information or the server identification information; and
    an instruction to transmit the device unique information of the electronic device to a management server device managing SIM related information and receive the SIM identification information or the server identification information from the management server device.

5. The electronic device of claim 2, wherein the at least one instruction further comprises receiving a profile that the selected communication service provider requests to be generated.

6. The electronic device of claim 5, wherein the at least one instruction comprises at least one of:
    an instruction to establish a session, between the SIM and a profile transmission support device corresponding to server identification information and control the SIM to receive, via the session, a profile from a support device that generates the profile; and
    an instruction to install the received profile in the SIM.

7. The electronic device of claim 1, wherein the at least one instruction, when the electronic device changes from a turn-off state to a turn-on state, the at least one wireless communication module searches for the accessible communication service provider or searches for the accessible communication service provider in accordance with receiving a request to change communication service provider.

8. The electronic device of claim 1, wherein the at least one instruction further comprises obtaining SIM related information from the SIM or an external server device managing SIM related information in correspondence to an input event and display the obtained SIM related information.

9. The electronic device of claim 8, wherein the at least one instruction further comprises outputting text information corresponding to the SIM related information or output code information corresponding to the SIM related information.

10. A method of managing a subscriber identification module (SIM), comprising:
    searching for an accessible communication service provider based on at least one wireless communication module;
    collecting information from the accessible communication service provider; and
    outputting the collected information,
    wherein a profile relating to a communication service connection provided from the accessible communication service provider is not installed, and
    wherein outputting the collected information comprises separating information from the accessible communication service provider from an uninstalled profile accessible communication service provider by a profile preset in the SIM in order of output and display in the separated information.

11. The method of claim 10, further comprising;
    receiving a selection of the communication service provider;
    collecting electronic device related information corresponding to the received selection; and
    transmitting the collected electronic device related information to the selected communication service provider.

12. The method of claim 11, wherein collecting electronic device related information comprises collecting at least one of device unique information of the electronic device, SIM identification information, and server identification information of a device supporting profile transmission.

13. The method of claim 12, wherein collecting electronic device related information comprises at least one of:
    collecting the SIM identification information or the server identification information written in the SIM; and
    transmitting the device unique information of the electronic device to a management server device managing SIM related information and receiving the SIM identification information or the server identification information from the management server device.

14. The method of claim 12, further comprising receiving a profile that the accessible communication service provider requests to be generated.

15. The method of claim 14, further comprising:
    establishing a session between the SIM and a profile transmission support device corresponding to the server identification information; and
    receiving, by the SIM, a profile from a support device that generates the profile through the session.

16. The method of claim 15, further comprising installing the received profile on the SIM.

17. The method of claim 10, wherein searching for the accessible communication service provider comprises at least one of:
    if an electronic device changes from a turn-off state to a turn-on state, searching for the accessible communication service provider; and
    searching for the accessible communication service provider in accordance with receiving a request to change communication service provider.

18. The method of claim 10, wherein outputting the collected communication service provider information comprises:
    obtaining SIM related information from the SIM or an external server device managing SIM related information in correspondence to an input event to display the obtained SIM related information.

19. The method of claim 18, wherein displaying the SIM related information comprises at least one of:
    outputting text information corresponding to the SIM related information; and
    outputting code information corresponding to the SIM related information.

* * * * *

UNITED STATES PATENT AND TRADEMARK OFFICE
CERTIFICATE OF CORRECTION

PATENT NO. : 9,577,692 B2
APPLICATION NO. : 14/804001
DATED : February 21, 2017
INVENTOR(S) : Sang Soo Lee et al.

Page 1 of 1

It is certified that error appears in the above-identified patent and that said Letters Patent is hereby corrected as shown below:

In the Claims

Column 24, Claim 6, Line 3, "an instruction to establish a session, between the SIM and" should be -- an instruction to establish a session between the SIM and --

Column 25, Claim 10, Line 16, "preset in the SIM in order of output and display in the" should be -- preset in the SIM in order of output and displaying the --

Signed and Sealed this
Twenty-fourth Day of July, 2018

Andrei Iancu
*Director of the United States Patent and Trademark Office*